United States Patent [19]

Butler et al.

[11] 3,993,826
[45] Nov. 23, 1976

[54] PRESSURE-SENSITIVE ADHESIVE TAPE SUBSTRATE

[75] Inventors: Geoffrey Langford Butler; Brian Gratton, both of Borehamwood, England

[73] Assignee: Adhesive Tapes Limited, Hertfordshire, England

[22] Filed: Jan. 14, 1975

[21] Appl. No.: 540,995

[30] Foreign Application Priority Data
Jan. 18, 1974   United Kingdom.................. 2527/74

[52] U.S. Cl. ............................ 428/220; 260/876 B; 260/897 A; 428/337; 428/339; 428/343; 428/521; 428/910
[51] Int. Cl.² ...................... B32B 27/32; C09J 7/02; C08L 53/02
[58] Field of Search ........... 428/343, 910, 337, 339, 428/355, 521, 220; 427/289; 260/876 B, 897 A

[56] References Cited
UNITED STATES PATENTS

| | | | |
|---|---|---|---|
| 2,631,594 | 3/1953 | Bright................................ | 428/343 |
| 2,822,286 | 2/1958 | Vogt.................................. | 428/343 |
| 2,993,876 | 7/1961 | McGlamery..................... | 260/897 A |
| 3,088,848 | 5/1963 | Tritsch.............................. | 428/343 |
| 3,372,049 | 3/1968 | Schoffhausen..................... | 428/343 |
| 3,466,187 | 9/1969 | Heinemann........................ | 428/343 |

*Primary Examiner*—George F. Lesmes
*Assistant Examiner*—Ellis P. Robinson
*Attorney, Agent, or Firm*—Ostrolenk, Faber, Gerb & Soffen

[57] ABSTRACT

A pressure-sensitive adhesive tape substrate consisting of polyolefinic film (such as polypropylene, polyethylene or more especially an ethylene propylene copolymer) contains a thermoplastic elastomer, usually in an amount below 30 parts by weight per hundred parts of polyolefine and, for example, polyisobutylene or styrene butadiene block copolymer, in order to impart increased splitting resistance in a transverse direction.

4 Claims, No Drawings

PRESSURE-SENSITIVE ADHESIVE TAPE SUBSTRATE

This invention relates to a substrate for pressure-sensitive adhesive tape, to the coated tape, and to a method for its production.

Adhesive tape generally consists of a suitable adhesive layer on a cloth, paper, or polymer film substrate. This invention is concerned with a suitable polymer film substrate, and tape made from it.

Polymer film substrates used in the production of pressure-sensitive adhesive tapes have a tendency to split apart under sudden transverse loading, and have a tendency to tear down their length if, for instance, only one corner of the free end of the tape is pulled when the tape is to be detached from a roll. These problems are particularly marked with tapes based on a polyvinyl chloride substrate. To some extent, this problem is overcome by the use of polyolefinic substrates. For instance, these have a greater resistance to split on transverse loading. However, they still suffer from the disadvantage that a sudden shock loading will split the tape, especially when the tape is longitudinally and monoaxially stressed. In practice, this arises, for instance, if the tape extends along the edge of a carton which is dropped so that the two connected faces are jerked apart relative to each other.

The present invention sets out to overcome this disadvantage by imparting resistance to splitting, and increased tensile strength, by alteration of the conventional polymer film composition.

The invention consists in a pressure-sensitive adhesive tape substrate of polyolefinic film containing thermoplastic elastomer.

The polyolefinic film substrate can be composed of a polypropylene (PP), a polyethylene (PE), preferably a high density PE, or an ethylene-polypropylene copolymer (EP). This last-named is a preferred material, and usually contains a predominant proportion by weight of propylene units. A preferred copolymer has the propylene units and ethylene units in the weight ratio ranges between 80:20 and 95:5 preferably 90:10 respectively, and is available under the trade name EPQ-30M. These polyolefinic polymers can be processed by extrusion, e.g. as a tubular film, with subsequent slitting into sheet followed by monoaxial stretching along the tape to tensilize it.

The compatible amount of thermoplstic elastomer should generally be below that amount where visible inhomogeneities or cloudiness are present, or where its presence leads to increased splitting on stretching.

In numerical terms, the proportion of thermoplastic elastomer is generally below 30 parts per 100 parts of polyolefin. All parts herein expressed are by weight unless otherwise specifically stated. From 5 to 15 parts of elastomer per 100 parts polyolefin are preferred, with from 10–15 parts being most preferred.

A wide range of elastomers can be used but polyisobutylene, butyl rubbers or block copolymers, especially such as the styrene-butadiene block copolymers of the S-B-S type, are particularly preferred. A particularly useful S-B-S type block copolymer is that available from Shell Chemicals Ltd. under the trade name CARIFLEX TR-1102. Moreover, a commercially available material containing (i) 80 parts by weight of a polypropylene and (ii) 20 parts by weight of polyisobutylene can be used. This material is available from Montedison S.p.A. under the Trade Name "MOPLEN Q 30 RS".

The tape substrate according to the invention can be further characterised by its thickness and tensile strength. Usually the substrate will be from 25 microns to 120 microns thick. Its tensile strength in the machine direction will usually be above 10 kilograms per 25 mm wide tape. Otherwise expressed, minimum tensile strength figures for usable film are e.g. 1,300 kg/cm$^2$ for 30$\mu$ film and 2400 kg/cm$^2$ for 50$\mu$, but more normally acceptable figures are respectively 1600 kg/cm$^2$ and 3200 kg/cm$^2$. The tensile strength for tape substrates of other widths and thicknesses can be related to this, although the relationships are not always strictly pro rata with thickness.

A comparative measurement of tensile strength across an eventual tape substrate can be obtained by simple apparatus, wherein progressively increasing weights are attached successively to sample lengths of transversely cut tape substrate and allowed to fall. The weight which under given fall conditions just breaks such a tape substrate is recorded.

An example of such a test was as follows:

One end of a 1 inch × 8 inch strip of film is cut transversely, i.e. from across the web and suspended in a jaw. A weight is clamped via an 8 inch length of string to the lower end to give a 4 inch test length between the clamps.

The weight is held level with the lower clamp and allowed to fall freely until it acts upon the film causing a stressing force.

The maximum weight the film will resist for at least nine out of ten samples is taken as "splitting resistance".

A minimum splitting resistance of 150 grams is considered suitable for tape conversion.

In an experiment carried out with 10:90 EP film the average "splitting resistance" weight ranged from 140 g. to 180 g. for an unmodified film, to over 500 g. for an otherwise identical film but containing polyisobutylene as described above and measured under identical conditions.

Although the invention is primarily concerned with the tape substrate itself, and to the adhesive tape made using such a substrate it also extends to a method of manufacturing pressure-sensitive adhesive tape wherein a substrate as described above is coated on at least one surface with a pressure-sensitive adhesive layer, and thereafter slit into tape.

It will be apparent to the man in the art that the incorporation of the elastomeric material in no way prevents incorporation of pigment, fillers, and/or soluble dyes so that substrate and tapes so loaded also form part of the invention. The presence of other units, i.e. of the thermoplastic elastomer, in the substrate formulation in no way reduces keying, and may indeed increase it.

The invention will be further described with reference to the following non-limiting examples:

EXAMPLE 1

E-P copolymer G.S.F.113 (ICI) of weight ratios 10:90 modified with 10% CARIFLEX TR1102 styrene-butadiene block copolymer.

| | | | Unmodified | Modified |
|---|---|---|---|---|
| GAUGE | | (microns) | 53 | 55 |
| TENSILE STRENGTH | (machine direction) | KG/cm² | 35470 | 34910 |
| ELONGATION AT BREAK | (machine direction) | % | 28 | 26 |
| SPLITTING RESISTANCE | (transverse direction) | g | 120 | 270 |

EXAMPLE 2

E-P 10:90 copolymer Moplen EPQ30M (Montecatini) modified with 10% Cariflex TR1102 styrene-butadiene copolymer. The measurements were taken as in Example 1.

| | | | Unmodified | Modified |
|---|---|---|---|---|
| GAUGE | | microns | 56 | 53 |
| TENSILE STRENGTH | (machine direction) | Kg/cm² | 26430 | 27930 |
| ELONGATION AT BREAK | (machine direction) | % | 30 | 25 |
| SPLITTING RESISTANCE | (transverse direction) | g | 140 | 230 |

EXAMPLE 3

E-P 10:90 polymer Moplen EPQ30M (Montecatini) modified by the incorporation of an equal amount by weight of Moplen Q30RS (the homopolymer) to give 10% polyisobutylene. The measurements were taken as in Example 1.

| | | | Unmodified | Modified |
|---|---|---|---|---|
| GAUGE | | microns | 56 | 54 |
| TENSILE STRENGTH | (machine direction) | Kg/cm² | 26430 | 29630 |
| ELONGATION | (machine direction) | % | 30 | 28 |
| SPLITTING RESISTANCE | (transverse direction) | g | 140 | 270 |

EXAMPLE 4

Polypropylene homopolymer modified by the incorporation of 20% polyisobutylene (Moplen Q30RS). The measurements were taken as in Example 1.

| | | | Unmodified | Modified |
|---|---|---|---|---|
| GAUGE | | microns | 56 | 55 |
| TENSILE STRENGTH | (machine direction) | Kg/cm² | 26430 | 32000 |
| ELONGATION | (machine direction) | % | 30 | 27 |
| SPLITTING RESISTANCE | (transverse direction) | g | 140 | more than 500 |

EXAMPLE 5

Polypropylene homopolymer Hostalen PPN 1060 (available from Hoechst) modified by the addition of 10% Cariflex TR1102 styrene-butadiene copolymer. The measurements were taken as in Example 1.

| | | | Unmodified | Modified |
|---|---|---|---|---|
| GAUGE | | microns | 57 | 50 |
| TENSILE STRENGTH | (machine direction) | Kg/cm² | 32500 | 27000 |
| ELONGATION | (machine direction) | % | 28 | 23 |
| SPLITTING RESISTANCE | (transverse direction) | g | 100 | 180 |

It will be apparent from the above Examples that the splitting resistance increases considerably relative to the unmodified material without detrimental effect upon the other properties.

We claim:

1. A pressure-sensitive adhesive tape substrate consisting essentially of an ethylene-propylene copolymer processing propylene units and ethylene units in weight ratios between 80:20 and 95:5 respectively together with a styrene-butadiene block copolymer thermoplastic elastomer in an amount below 30 parts by weight per hundred parts of polyolefin, said substrate being from 25 to 120 microns thick, having a tensile strength in the tape direction of at least 10 kg. per 25 mm. width of tape, and having been tensilized by monoaxial stretching in the tape direction.

2. An adhesive tape substrate as claimed in claim 1 in which the proportion of thermoplastic elastomer is from 5 to 15 parts by weight per hundred parts of polyolefin.

3. An adhesive tape substrate as claimed in claim 1 loaded with a pigment, filler, and/or soluble dye.

4. A pressure sensitive adhesive tape comprising the adhesive tape substrate of claim 1 having on at lest one surface thereof a coating of a pressure sensitive adhesive.

* * * * *

UNITED STATES PATENT OFFICE
CERTIFICATE OF CORRECTION

Patent No. 3,993,826  Dated November 23, 1976

Inventor(s) Geoffrey Langford Butler; Brian Gratton

It is certified that error appears in the above-identified patent and that said Letters Patent are hereby corrected as shown below:

In Column 3, in the first Table for the Tensile Strength values of "35470" and "34910", read --3540-- and --3491--, respectively; in the second Table for the Tensile Strength values of "26430" and "27930", read --2643-- and --2793--, respectively; in the third Table, for the Tensile Strength values of "26430" and "29630", read --2643-- and --2963--, respectively; in the fourth Table, for the Tensile Strength values of "26430" and "32000", read --2643-- and --3200--, respectively; and in the fifth Table, for the Tensile Strength values of "32500" and "27000", read --3250-- and --2700--, respectively.

Signed and Sealed this

Eighteenth Day of October 1977

[SEAL]

Attest:

RUTH C. MASON
Attesting Officer

LUTRELLE F. PARKER
Acting Commissioner of Patents and Trademarks